United States Patent [19]

Mattei et al.

[11] Patent Number: 4,700,825
[45] Date of Patent: Oct. 20, 1987

[54] METHOD FOR FORMING INCOMPLETE GROUPS OF CIGARETTES IN A CIGARETTE PACKETING MACHINE

[75] Inventors: Riccardo Mattei, Bologna; Marco Brizzi, Zola Predosa, both of Italy

[73] Assignee: G.D Societa' per Azioni, Bologna, Italy

[21] Appl. No.: 744,034

[22] Filed: Jun. 12, 1985

[30] Foreign Application Priority Data

Jun. 22, 1984 [IT] Italy .................. 3500 A/84

[51] Int. Cl.⁴ ............................. B65G 47/26
[52] U.S. Cl. .................... 198/419; 198/420; 53/149; 53/150; 53/151; 53/444
[58] Field of Search ............. 53/53, 54, 148, 149, 53/150, 151, 444, 447, 494; 198/419, 420, 422; 131/282, 283, 285

[56] References Cited

U.S. PATENT DOCUMENTS 3,106,282 10/1963 Schmermund ............ 198/419
3,435,940 4/1969 Seragnoli ................ 198/420 X
3,642,112 2/1972 Seragnoli ................ 198/419
4,209,955 7/1980 Seragnoli ................ 53/54
4,306,648 12/1981 Manservisi et al. ........ 198/419
4,362,235 12/1982 Erdmann ................ 198/419
4,364,464 12/1982 Manservisi et al. ........ 198/419
4,471,866 9/1984 Erdmann et al. ........ 198/419
4,503,967 3/1985 Erdmann et al. ........ 198/419
4,526,268 7/1985 Hoffmann et al. ........ 198/419
4,528,801 7/1985 Seragnoli et al. ........ 53/151 X
4,531,627 7/1985 Mattei et al. ........... 198/420

FOREIGN PATENT DOCUMENTS 2616219 4/1981 Fed. Rep. of Germany ...... 198/419
3234926 3/1984 Fed. Rep. of Germany ........ 53/150
0434662 9/1935 United Kingdom ............... 198/419
2104035 3/1983 United Kingdom ............... 53/444

Primary Examiner—Robert J. Spar
Assistant Examiner—Lyle Kimms
Attorney, Agent, or Firm—Marshall, O'Toole, Gerstein, Murray & Bicknell

[57] ABSTRACT

In a cigarette packeting machine, the formation of groups of cigarettes to be packeted disposed in superposed layers of which at least one is incomplete in that it lacks at least one intermediate cigarette. The cigarettes of the incomplete layer being kept in position, inside a formation and advancement pocket for the relative group, by the cigarettes of an immediately upper complete layer which are fed into the pocket so that they become disposed quincuncially to the cigarettes of the incomplete layer.

9 Claims, 7 Drawing Figures

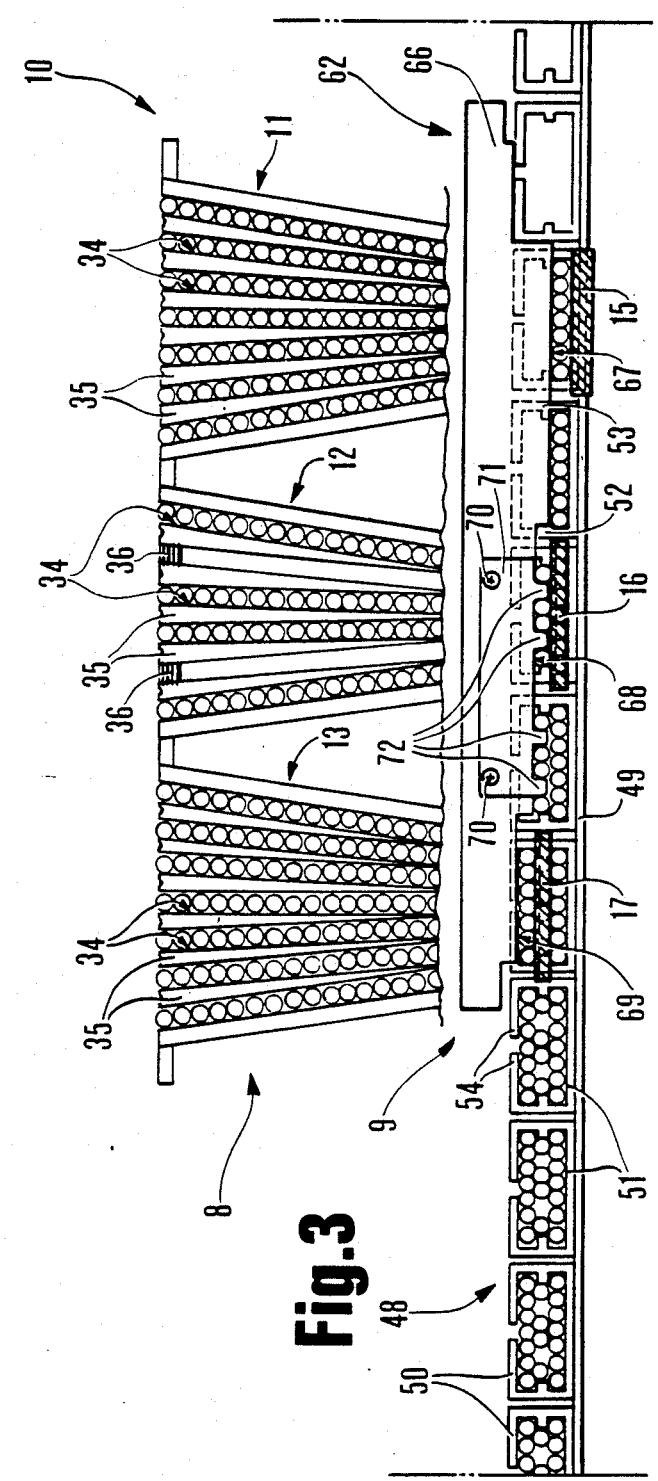

METHOD FOR FORMING INCOMPLETE GROUPS OF CIGARETTES IN A CIGARETTE PACKETING MACHINE

BACKGROUND OF THE INVENTION

This invention relates to a method for forming, in a cigarette packeting machine, incomplete groups of cigarettes which constitue the contents of respective packets.

The packets produced by packeting machines normally comprise twenty cigarettes distributed in three adjacent, superposed layers. However, said packeting machines are normally adjustable in order to produce packets of different formats containing a number of cigarettes which normally varies between ten and twentyfive, and distributed in at least two superposed layers.

The continual variation in the selling price of cigarettes and the increasingly extensive use of automatic cigarette vending machines have made it increasingly more necessary to produce packets of cigarettes which, although having the same format and thus using the same wrapping material and the same types of vending machines, can contain a variable number of cigarettes so as to keep their selling price substantially unchanged over a relatively long period of time and/or to adjust the said price to a determined size of currency note so as to avoid the automatic dispensing of change.

Hereinafter, the term "incomplete" is used to indicate a packet of cigarettes, a group of cigarettes constituting the contents of a packet, or a layer of cigarettes of said group, in which at least one of the cigarettes is missing.

With reference to the aforesaid problem, the term "incomplete" will therefore be used to define those packets, groups and/or layers of cigarettes which are obtained by eliminating at least one cigarette at the formation stage in such a manner that the resultant incomplete packet retains the overall dimensions and thus the wrapping of the corresponding complete packet, but contains one or more cigarettes fewer.

In known packeting machines, the formation of incomplete packets of cigarettes normally involves certain difficulties for the obvious reason that such machines are designed for forming complete packets, and all their mechanical and safety characteristics are conceived for this purpose.

The aforesaid applies particularly to that part of the said known packeting machines used for forming the groups of cigarettes which are then wrapped in order to form the packets. In this respect, the said groups are generally formed starting from a plurality of side-by-side hoppers, the number of which is equal to the number of superposed layers of cigarettes contained in each group.

Each of the said layers is formed on the base of the respective hopper and is fed into a group formation and conveying pocket, which is mobile with stepwise movement in such a manner that it halts in succession in a position facing each of said hoppers. The base surfaces of these latter are disposed at gradually increasing levels to enable the cigarettes withdrawn from one hopper to lie on the cigarettes withdrawn from the preceding hopper.

During their withdrawal from the respective hopper, the cigarettes are thrust axially by a pusher out of said hopper and into the relative pocket, the advancement movement of which takes place in a direction transverse to the cigarette axis. The insertion of the cigarettes into the relative pocket and their sliding over the immediately lower layer already disposed inside the pocket are favoured by the presence of a guide plate which extends above said lower layer to cover an initial portion of the cigarettes thereof and to prevent any interference.

Once inserted, the cigarettes of one layer stop against a stop wall so as to lie exactly over the cigarettes of the lower layer, and are halted against these latter by a lateral stop element which is lowered on to the cigarettes so as to keep them in position against the cigarettes of the lower layer and within the relative pocket when this latter undergoes a further forward step.

Because the said guide plate, which is mounted in a fixed position below the respective hopper, remains between the layer which has just been fed and the immediately lower layer, the terminal parts of the cigarettes of the said two layers in contact with said plate undergo sliding when said pocket advances through one step.

This fact does not constitute a drawback when complete layers are formed, but is absolutely damaging when incomplete layers are formed because the friction against said plate, although of negligible value, is sufficient to transversely displace the cigarettes of a layer when this latter comprises voids.

SUMMARY OF THE INVENTION

The object of the present invention is to provide a method for forming incomplete groups of cigarettes, which obviates the aforesaid drawback.

Said object is attained according to the present invention by a method for forming, in a cigarette packeting machine, incomplete groups of cigarettes constituting the contents of respective packets and each comprising at least two layers of side-by-side cigarettes disposed one on the other, at least one of said layers being incomplete by lacking at least one intermediate cigarette; the method comprising feeding said layers in succession parallel to said cigarettes into a formation and conveying pocket for the relative said group, said pocket being mobile stepwise transversely to said cigarettes, each of said layers being introduced during a stoppage of said conveying pocket, characterised in that said incomplete layer is disposed below a complete layer, the cigarettes of which are disposed quincuncially to those of said incomplete layer, and by comprising the following stages:

axially feeding the cigarettes of said incomplete layer into said pocket during a first halt thereof in a first feed position until they come into contact with first axial stop means;

causing said pocket to undergo a second halt in a second feed position so that the cigarettes of said incomplete layer stop with their terminal portion below guide means for the insertion of said upper complete layer;

axially feeding the cigarettes of said upper complete layer above said guide means and into said pocket until they are brought axially into contact with second axial stop means, these latter being disposed rearwards of said first axial stop means, in a direction transverse to the direction of advancement of said pocket, by a distance at least equal to the length of said terminal portion covered by said guide means;

uncovering said terminal portion of the cigarettes of said incomplete layer; and causing the cigarettes of said complete and incomplete layers to undergo a relative axial movement so as to superpose said layers one on the other in a substantially perfect manner.

BRIEF DESCRIPTION OF THE DRAWINGS

The invention is described hereinafter with reference to the accompanying figures, which illustrate a non-limiting embodiment thereof, and in which:

FIGS. 1 and 2 are two end views of two examples of incomplete groups of cigarettes;

FIG. 3 is a diagrammatic side elevation, with parts in section and parts removed for clarity, of a cigarette packeting machine provided with a station for forming incomplete groups of cigarettes in accordance with the method of the present invention;

DETAILED DESCRIPTION OF THE INVENTION

Figure 4:
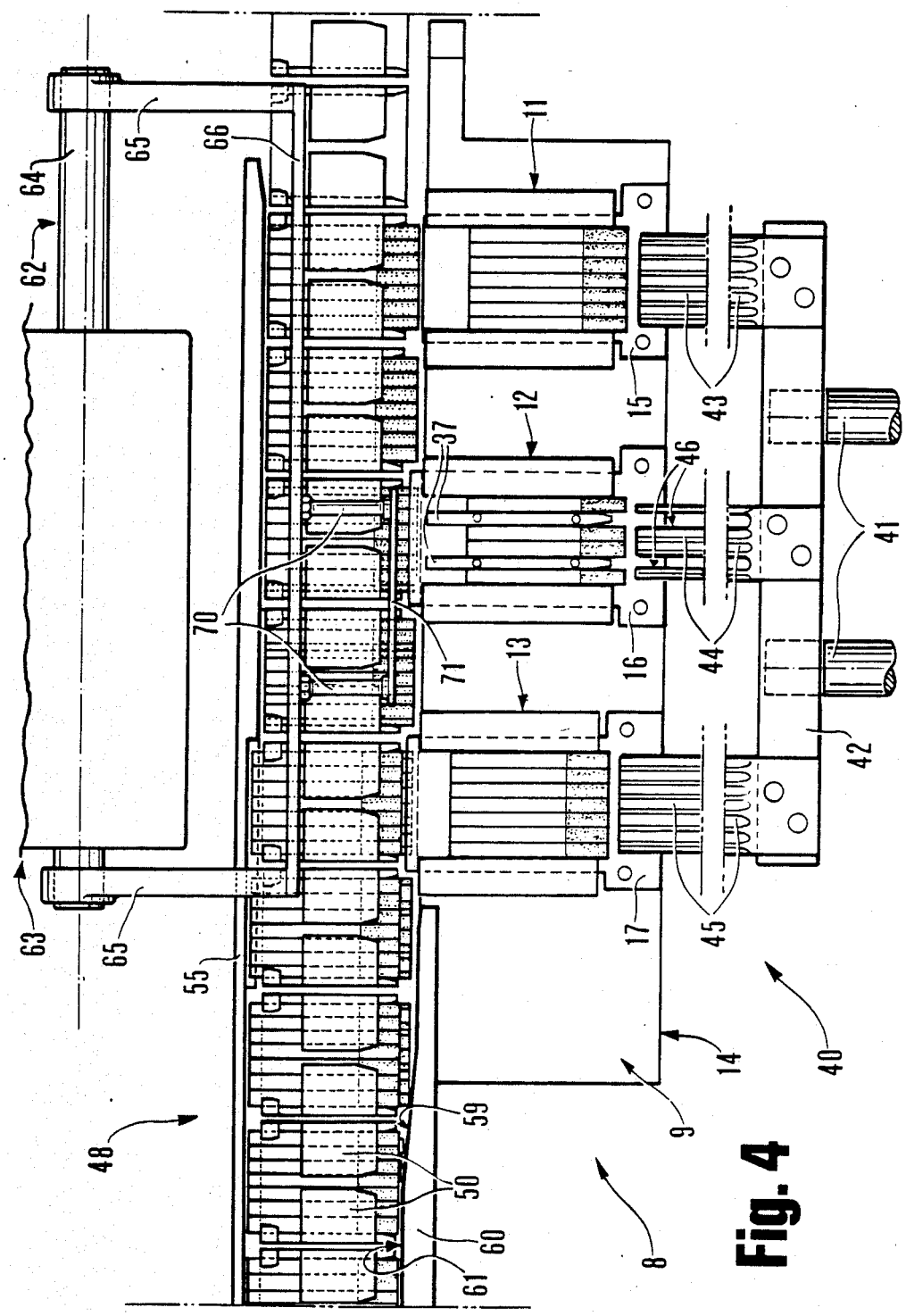
FIG. 4 is a plan view of the group formation station shown in FIG. 3.

FIGS. 1 and 2 show two incomplete groups 1 and 2 of cigarettes 3 which are distributed in three layers 4, 5 and 6 in each of the groups 1 and 2. In particular, in both groups 1 and 2, the upper layer 6 and the lower layer 4 are complete, whereas the intermediate layer 5 is incomplete and comprises two voids 7 in the group 1 and a single void 7 in the group 2, the voids 7 each corresponding to a missing cigarette 3.

The groups 1 and 2 possess the common characteristic that the cigarettes 3 of the incomplete layer (namely the intermediate layer 5 in the particular examples shown) and of the immediately upper complete layer (namely the layer 6 in the examples shown) are disposed quincuncially.

FIGS. 3 onwards show a packeting machine 8 comprising, by way of example, a formation unit 9 for incomplete groups of cigarettes of the type shown in FIG. 1.

As shown in FIGS. 3 and 4, the unit 9 comprises an inlet container 10 provided lowerly with three outlet hoppers 11, 12 and 13, each of which is responsible for the formation of a respective layer 4, 5 and 6. The hoppers 11, 12 and 13 are disposed on a frame 14, to the upper end of which there are connected three plates 15, 16 and 17 which constitute the lower ends of said hoppers 11, 12 and 13 respectively.

In particular, the plates 15, 16 and 17 are not disposed at the same level, but at decreasing levels, each of which differs from the level of the preceding plate by a distance at least equal to the diameter of the cigarettes 3.

The hoppers 11 and 12 comprise a substantially vertical rear wall 18 and a substantially vertical front wall 19 which terminate a short distance from the respective base plates 15 and 16 and define therewith a rear slot 20 and a front slot 21. In particular, each slot 20 has a height normally less than the diameter of the cigarettes 3, whereas each front slot 21 has a height at least equal to the diameter of the cigarettes 3. In the particular example illustrated, each front wall 19 frontwardly comprises a lower transverse rib 22, the lower surface of which defines the upper surface of the slot 21 and is inclined outwards and downwards so as to define a lead-in surface 23.

Figure 5:
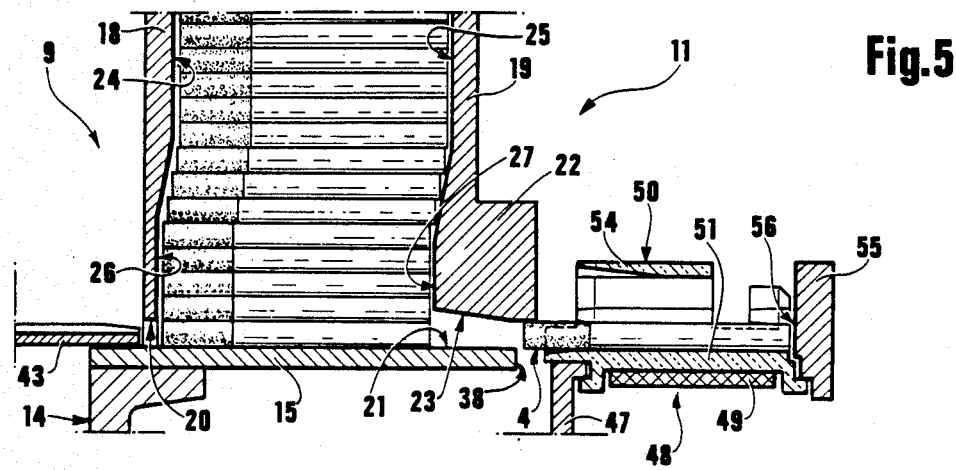
FIGS. 5, 6 and 7 are side elevations of three separate parts of the station of FIG. 3 at respective moments of operation.
Figure 6:
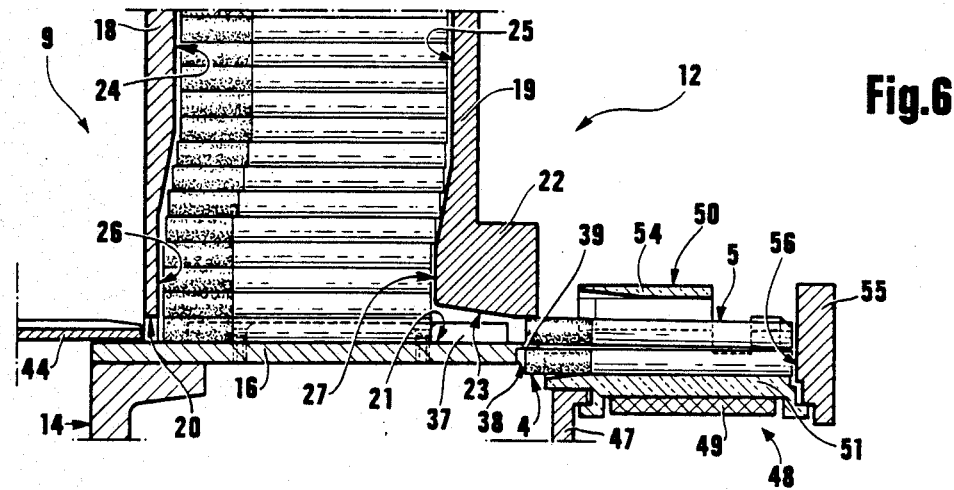

As shown in FIGS. 5 and 6, the walls 18 and 19 have their inner surfaces 24 and 25 disposed at a constant distance from each other which is at least equal to the length of the cigarettes 3, but they are not flat in that in their lower part the first comprises a recess 26 and the second a projection 27, these being conjugate and arranged to displace the cigarettes 3 sliding along the hopper 11 and 12 rearwards by a determined distance. The extent of this rearward displacement and its purpose are stated hereinafter.

Figure 7:
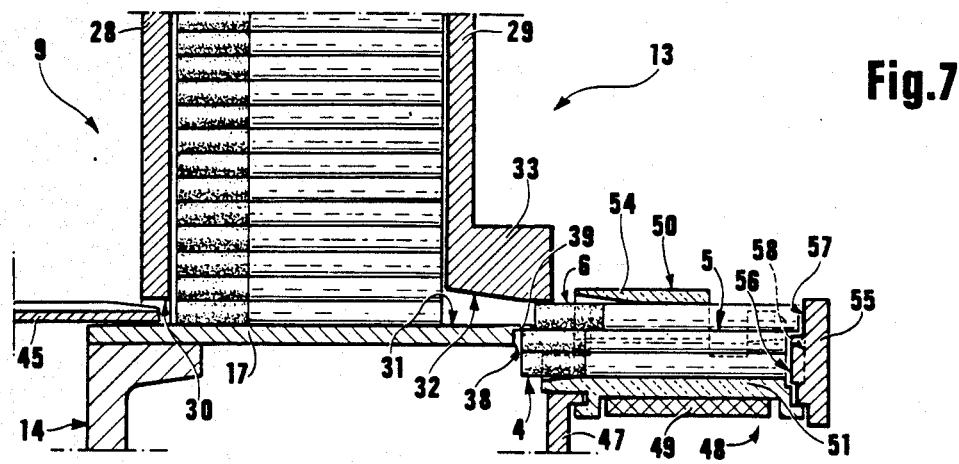

As shown in FIG. 7, the hopper 13 has a rear wall 28 and a front wall 29 which are aligned respectively with the upper part of the walls 18 and 19 and comprise perfectly flat inner surfaces. Analogously to the walls 18 and 19, the walls 28 and 29 also define, with the relative plate 17, a rear slot 30 and a front slot 31, this latter being bounded upperly by an inclined lead-in surface 32 constituting the lower surface of a transverse rib 33 analogous to the ribs 22 and rigid with the lower end of the wall 29.

As shown in particular in FIG. 3, the hoppers 11, 12 and 13 are divided internally into a plurality of descending channels 34 by a plurality of transverse walls 35 substantially perpendicular to the walls 18 and 19 in the hoppers 11 and 12, and to the walls 28 and 29 in the hopper 13. In the hopper 12, two intermediate channels 34 are closed upperly by respective plugs 36 and lowerly by two ribs 37 rigid with the plate 16 and extending to the outside of said hopper 12 through the slot 21 of this latter.

As shown in FIGS. 5, 6 and 7, the plates 15, 16 and 17 are frontwardly bounded by respective flat coplanar vertical surfaces 38. The surfaces 38 of the plates 16 and 17 are upperly provided with respective guide means constituted by horizontal plates 39 disposed below the surfaces 23 and 32 respectively.

To the rear of the hoppers 11, 12 and 13 there is mounted a pusher device 40 comprising two push rods 41 driven by reciprocating drive means, not shown, and joined together at their front end by a cross-member 42, from which there forwardly extend three substantially horizontal pushers 43, 44 and 45, of which the first two are aligned with the respective slots 20, whereas the third is aligned with the slot 30. The pusher 44 comprises two longitudinal slits 46 which are slidably engaged by the respective ribs 37 when the pusher 44 is advanced through the respective slot 20 and the hopper 12.

As shown in FIG. 4 the pusher 45 has a length which is greater than the length of the pushers 43 and 44 by a distance equal to the rearward displacement of the walls 18 and 19 at the recesses 26 and projections 27. In this manner, when the pusher device 40 is in its withdrawn rest position shown in FIG. 4, the free ends of the pushers 43, 44 and 45 are all of the same distance from the ends of the cigarettes 3 which respectively face them.

At its front end, the frame 14 comprises a wall 47 which is disposed frontwards of the front ends of the plates 15, 16 and 17 and constitutes a support and guide for a conveyor 48 extending to the front of the hoppers 11, 12 and 13 transversely to the axis of the cigarettes 3 contained in said hoppers and to the axis of the rods 41 and pushers 43, 33 and 45.

The conveyor 48 comprises a belt 49 to which there is connected a plurality of formation and conveying pockets 50 for the groups 1, these pockets being uniformly distributed along the belt 49 and disposed at a distance apart which is equal to a sub-multiple of the distance between the bottom ends of the hoppers 11, 12 and 13. Each pocket 50 comprises a lower wall 51 rigid with the belt 49 and coplanar with the plate 15. Each wall 51 has connected to it two side walls 52 and 53 having their upper ends 54 bent above the wall 51 and disposed perpendicular to the walls 18, 19, 28 and 29. As shown in particular in FIGS. 5, 6 and 7, the front and rear axial ends of the pockets 50 are open, and when the cigarettes 3 have penetrated through the rear end of the respective pockets 50 they are halted in their correct axial position inside these latter by a stop wall 55 facing the front end of the pockets 50 and extending along the belt 49 parallel to the walls 19 and 29.

On that side which faces the conveyor 48, the wall 55 has a flat surface 56 which as will be apparent hereinafter constitutes an axial stop means for the cigarettes 3 of the layers 4 and 5, and extends in front of the hoppers 11 and 12 to comprise upperly, in a position corresponding with the hopper 13, a recess 57 which extends upwards from the level of the front surface of the plate 17 and has a depth equal to the difference in length between the pusher 45 and the pushers 43 and 44. As will be apparent hereinafter, the recess 57 constitutes an axial stop means for the cigarettes 3 forming part of the layers 6. Downstream of the hopper 13, the surface 58 of the wall 55 on that side facing the conveyor 48 is coplanar with the rear surface of the recess 57 and faces a cam surface 59 of a wall 60 disposed downstream of the hopper 13 in the direction of advancement of the conveyor 48 in a position facing the wall 55 and on the opposite side of the conveyor 48 to this latter.

The surface 59 is inclined to the surface 58 in the direction towards it, and joins into a flat surface 61, the distance of which from the surface 58 is substantially equal to the length of the cigarettes 3.

On the opposite side of the conveyor 48 to that which faces the hoppers 11, 12 and 13 there are disposed locking means constituted by a mobile locking device indicated overall by 62 and comprising an actuator 63 which imparts axial reciprocating motion and reciprocating rotary motion to its output rod 64, which extends parallel to the conveyor 48.

On the opposite ends of the rod 64 there are keyed the ends of two arms 65 substantially perpendicular to the rod 64 and connected together at their other end by a blade 66. This latter extends above the conveyor 48 in a position facing the hoppers 11, 12 and 13, and its lower edge defines three steps 67, 68 and 69.

By executing the translational and rotary movements of the rod 64 suitably out of phase, it is possible to move the blade 66 firstly towards the conveyor 48 into the lowered position shown in FIG. 3, in which the steps 67, 68 and 69 are disposed in contact respectively with the layers 4, 5 and 6 of successive pockets; then parallel to the conveyor 48 to accompany it during its advancement through one step; and then upwards and rearwards towards its initial raised position.

Two rods 70 extend parallel to the arms 65 from a central portion of the blade 66 and support a plate 71 which is connected to their free ends in a manner parallel to the blade 66 and substantially extending over that portion of this latter occupied by the step 68.

The plate 71 has its lower edge coplanar with the edge of the step 68 and is provided with a plurality of appendices 72, each of which engages a respective void 7.

In practice, the unit 9 is constructed in such a manner as to act simultaneously on three successive pockets 50. However, for reasons of clarity, the operation of the unit 9 will be described with reference to the formation of a single group 1 inside a relative pocket 50, starting from the moment in which this latter, on termination of an advancement step of the conveyor 48, becomes disposed in a position facing the hopper 11.

When said pocket 50 halts in the said commencement position for the cycle involving the formation of a group 1, the blade 66 is in its raised position with its step 67 above the pocket 50, the pusher 43 is in its withdrawn position shown in FIG. 4, and a layer 4 of ciagarettes is disposed on the base of the hopper 11 in contact with the plate 15 and aligned with the relative slots 20 and 21.

At this point, the pusher 43 is advanced so as to engage said slot 20 and axially push the cigarettes 3 of the layer 4 through the slot 21 and into the pocket 50 until they come into contact with the stop surface 56 of the plate 55 in the position shown in FIG. 5. The blade 66 is the lowered until the step 67 is brought into contact with the cigarettes 3 of said layer 4 disposed inside the pocket 50, and the pusher 43 is returned to its withdrawn position shown in FIG. 4.

The conveyor 48 is then advanced stepwise until the pocket 50 is brought into a position facing the hopper 12. During each advancement step, the blade 66 is lowered so as to keep the cigarettes 3 of the layer 4 in contact with the base wall 51 of the pocket 50 and, in particular, to ensure that a terminal portion of the cigarettes 3 becomes inserted below the plate 39 of the hopper 12 as the pocket 50 advances to stop in front of said hopper 12.

At this point, the blade 66 is raised ane withdrawn so that its step 68 and the plate 71 become disposed in a raised position above the pocket 50.

Subsequent operation of the pusher 44 causes the cigarettes 3 of the incomplete layer 5 to emerge from the hopper 12 and to enter the pocket 50 until they halt against the stop surface 56 in the position shown in FIG. 6.

The aforesaid position is attainable because of the presence of said plate 39, which prevents any interference between the cigarettes of the layer 4 and the cigarettes of the layer 5 when these latter penetrate into the pocket 50.

When the cigarettes of the layer 5 are completely inserted, they are locked in position by lowering the blade 66 and plate 71, the appendices 72 of which occupy the voids 7 of said layer 5. Consequently, the rear terminal portions of the cigarettes 3 of the layers 4 and 5 remain separated from each other by said plate 39 even when the conveyor 48 again advances, and they slide in contact with the plate 39 without their transverse positions altering, because of the presence of the blade 66 and plate 71 and the appendices 72.

The blade 66 and plate 71 keep the cigarettes of the layers 4 and 5 in position until the pocket 50 halts in front of the hopper 13. At this point, the blade 66 is raised and withdrawn so that its step 69 becomes disposed in a raised position above the pocket 50, whereas the end portions of the cigarette 3 of the layer 5 remain engaged below the plate 39 of the hopper 13.

Subsequent operation of the pusher 45 causes the cigarettes 3 of the layer 6 to emerge from the hopper 13 and enter the pocket 50 until their front end halts in contact with the rear surface of the recess 57 in the position shown in FIG. 7.

As the plate 39 and recess 57 have substantially equal transverse dimensions, the rear end of the cigarettes of the upper layer 6 leaves the plate 39 when their front end reaches the rear of the recess 57. Consequently, the cigarettes of the layer 6 rest completely in contact with the cigarettes of the layer 5, and are able to lock these latter transversely by being disposed quincuncially to the cigarettes of the layer 5, as shown in FIG. 1.

Consequently, when the conveyor 48 advances again subsequent to the lowering of the plate 66, the cigarettes of the layer 5 do not move transversely, notwithstanding their friction against the plate 39 and the presence of the voids 7.

The subsequent advancement movements of the pocket 50 bring the cigarettes of the layers 4 and 5 into rearward contact with the cam surface 59, which causes them to advance axially to bring them into perfect vertical alignment with the cigarettes of the upper layer 6. With regard to the unit 9, it should be noted that some of its described structural characteristics are due to the fact that, as stated heretofore and as clearly shown on the accompanying drawings, there are three groups 1 simultaneously under formation in front of the hoppers 11, 12 and 13, of which the pushers 43, 44 and 45 are operated simultaneously.

In particular, the pushers 43, 44 and 45 being rigid with each other, the recesses 26 and the projections 27 are provided in order to reduce the distance between the pushers 43 and 44 and the respective layers 4 and 5, in order to make it equal to the distance between the pusher 45 and the relative layer 6. In this manner, the impacts of the pushing ends of the pushers 43, 44 and 45 against the ends of the cigarettes are made uniform at a minimum value.

It is apparent that although the unit 9 illustrated by way of example is designed for forming incomplete groups 1 of three layers each comprising determined numbers of cigarettes 3, it can be easily modified in a manner obvious to any expert, so as to form groups comprising two layers or more than three layers each containing different number of cigarettes, the only precaution required being to always superpose on an incomplete layer a complete layer having its cigarettes disposed quincuncially to those of the lower incomplete layer, and to introduce the cigarettes of the complete layer into the pocket of the group formation and advancement conveyor in the manner illustrated in FIG. 7.

We claim:

1. A method for forming, in a cigarette packing machine, incomplete groups of cigarettes each adapted to fill an inner space of a respective packet and comprising at least two layers of side-by-side cigarettes, one of said two layers being an incomplete layer lacking at least one intermediate cigarette, and the other of said two layers being a complete layer, and being arranged above said incomplete layer; each cigarette of said incomplete layer being arranged in contact with two cigarettes of said complete layer, and being staggered by half a diameter in relation to said two contacting cigarettes;

the method comprising the steps of:
arranging said incomplete layer;
axially feeding the cigarettes of said incomplete layer into casing means defining a space equal to said inner space and advancing stepwise along a path extending transversely to said cigarettes; said cigarettes of said incomplete layer being fed into said casing means during a first halt thereof in a first feed position, and until said cigarettes of said incomplete layer come axially into contact with first axial stop means;

causing said casing means to undergo a second halt in a second feed position so that each cigarette of said incomplete layer stops with a terminal portion of cigarettes below guide means for the insertion of said upper complete layer, said guide means being arranged at said second feed position;

arranging said complete layer;

axially feeding the cigarettes of said complete layer above said guide means and into said casing means until they come axially into contact with second axial stop means, said second axial stop means being arranged rearwardly of said first axial stop means, in a direction of said axial feeding of said cigarettes, by a distance at least equal to the length of said terminal portion covered by said guide means, so that, when in contact with said second axial stop means, said cigarettes of said complete layer lie in said staggered relationship on top of, and extend partially beyond, said cigarettes of said incompete layer;

advancing said casing means from said second feed position so as to uncover said terminal portion of the cigarettes of said incomplete layer; and causing the cigarettes of said complete layer and of said incomplete layer to undergo a relative axial displacement so as to completely superpose said layers one on the other.

2. A method as claimed in claim 1, further comprising a step consisting in maintaining, by transverse locking means, the cigarettes of said incomplete layer in their respective relative positions during an advancement movement of said casing means between said first and said second halt.

3. A method as claimed in claim 2, wherein said locking means are advanced with said casing means during said advancement movement.

4. A method as claimed in claim 3, wherein said locking means comprise at least one plate, a lateral edge of which is made to cooperate laterally with the cigarettes of said incomplete layer during said advancement movement of said casing means; said plate comprising along said edge, for each missing cigarette of said incomplete layer, an appendix which is made to engage a respective void corresponding to the respective said missing cigarette.

5. A method as claimed in claim 1, wherein said layers are formed inside respective hoppers disposed in succession along said path and laterally thereto in positions corresponding with respective said feed positions; said axial stop means being arranged along said path laterally to said casing means and on the opposite side thereof relative to said hoppers.

6. A method as claimed in claim 5, wherein said first and second axial stop means are defined by a fixed wall extending along said path transversely to said cigarettes; one end of the cigarettes of said incomplete layer being brought into contact with a lateral surface of said wall, and one end of the cigarettes of said complete layer being brought into contact with a bottom of a recess provided on said lateral surface.

7. A method as claimed in claim 5, wherein said guide means comprise a fixed plate arranged at said second feed position; said casing means, when moving between said first and second feed positions, causing said terminal portion of the cigarettes of said incomplete layer to enter in succession a space arranged below said fixed plate so that, when said casing means undergo said second halt, said fixed plate is arranged above, and in contact with, said terminal portion of all the cigarettes of said incomplete layer.

8. A method as claimed in claim 5, wherein said casing means are in the form of a pocket-shaped member constituting part of a conveyer comprising a plurality of equally spaced said members arranged at a distance to one another equal to the distance between said feed positions; said conveyer being advanced stepwise so that, at each halt of said conveyor, each said feed position is occupied by a respective said member, and so that each said member occupies in succession all said feed positions; said layers being fed simultaneously to respective said members when each said halt occurs.

9. A method as claimed in claim 8, wherein said layers are fed simultaneously into said pocket-shaped members by a single pushing device comprising mutually rigid pushers equal in number to the number of said hoppers and each mobile through a respective said hopper in a direction parallel to said cigarettes and transverse to said conveyor; the formation hopper for said complete layer and the respective said pusher being arranged facing said second axial stop means and at a distance therefrom equal to the distance between said first axial stop means and each other said hopper and, respectively, each other said pusher.

* * * * *